M. G. CARLETON.
Thrashing-Machines.

No. 139,866. Patented June 17, 1873.

Witnesses:
G. Mathins
H. H. Ham.

Inventor:
Monroe G. Carleton

UNITED STATES PATENT OFFICE.

MONROE G. CARLETON, OF INDIANOLA, IOWA.

IMPROVEMENT IN THRASHING-MACHINES.

Specification forming part of Letters Patent No. 139,866, dated June 17, 1873; application filed April 14, 1873.

*To all whom it may concern:*

Be it known that I, MONROE G. CARLETON, of Indianola, county of Warren, State of Iowa, have invented a Self-Feeding Attachment for Thrashing-Machines, of which the following is a specification:

This invention relates to an attachment to thrashing-machines for cutting the straw into short lengths, in order to facilitate the ready passage through the thrashing cylinder; and to this end the invention consists in the employment of two revolving shafts carrying knives for cutting the straw into short lengths, the entire operative devices being inclosed in a hopper or a casing arranged in proper relation to the thrashing-cylinder.

Figure 1:
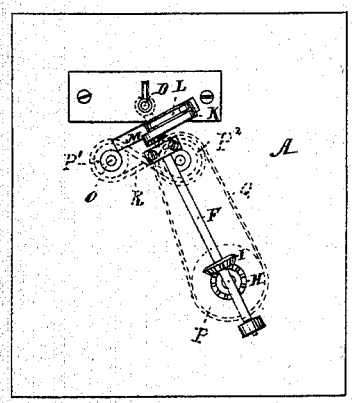
Figure 2:
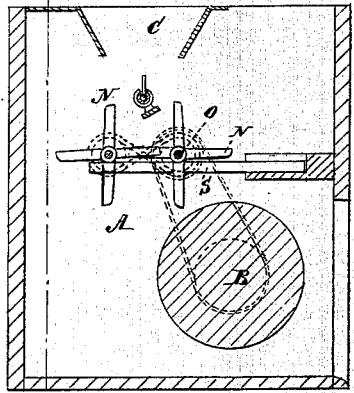
Figure 3:
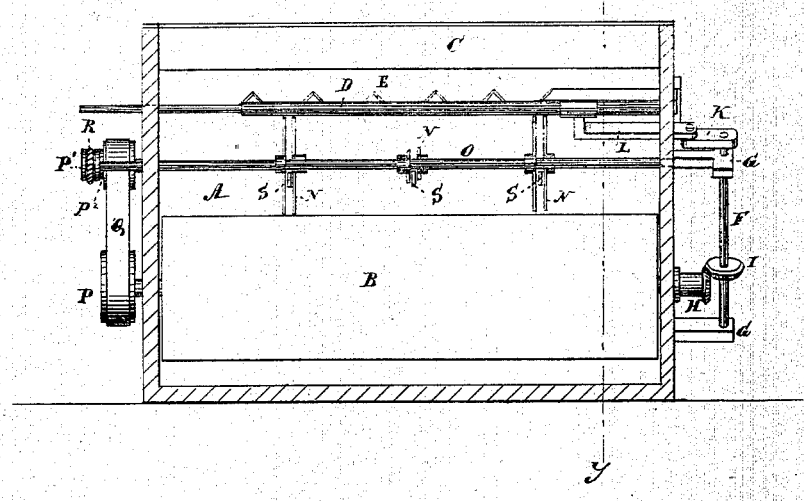

In the drawings, Figure 1 is an end elevation of my invention. Fig. 2 is a cross-section through line $y\ y$ of Fig. 3. Fig. 3 is a longitudinal section taken through line $x\ x$ of Fig. 2.

The casing A into which the grain-sheaves are fed in their passage to the thrashing-cylinder B, is provided with a hopper, C, below which is arranged a horizontally reciprocating cutter-bar, D, provided with a series of cutters, E, similar to harvester-cutters. A rapid motion is transmitted to said cutter-bar through the medium of an external obliquely arranged shaft, F, which is journaled or stepped at its ends into brackets G G, and operated through the medium of bevel-gearing H I, arranged respectively on the projecting end of the cylinder-shaft and central portion of the oblique shaft. To the upper end of the shaft F is attached a crank-arm, K, which is through the medium of a rod, L, connected to the cutter-bar, said rod passing and operating in an inclined slot or opening, M, in the end of the casing A. The sheaf of grain when introduced into the hopper is first subjected to the action of the reciprocating cutter-bar, which serves to sever the retaining bands, and then the straw is cut into short lengths by means of revolving knives or cutters N applied to a pair of parallel shafts, O, which are operated from the shaft of the thrashing-cylidner by means of pulleys P $P^1$ $P^2$ and belts Q R. The cutters are so arranged on their respective shafts as to operate nearly in contact with each other in order to obtain a spear-like action upon the material, and, being disposed on opposite sides of projecting plates S, they are rendered self-sharpening by constant contact with said plates.

An attachment for thrashing-machines constructed as described possesses the advantage of cutting the retaining-bands of the sheaves, thus effecting automatically what has hitherto been done by hand, and by reason of the cutting of the straw into short lengths, its passage through the thrashing-cylinder is greatly facilitated, as will be apparent.

Having thus described my invention, what I claim as new, and desire to secure by Letters Patent, is—

1. In combination with a thrashing-machine, I claim the employment of one or more revolving shafts armed with cutters or knives for cutting the straw into short lengths, as and for the purpose specified.

2. The combination, with a thrashing-machine feeding-hopper, of a reciprocating band-cutter and revolving cutter-shafts, as and for the purpose specified.

MONROE G. CARLETON.

Witnesses:
H. H. HAM,
A. HAM.